T. D. QUIGLEY.
PNEUMATIC VEHICLE SPRING.
APPLICATION FILED APR. 11, 1910.

1,029,945.

Patented June 18, 1912.

Witnesses:
F. E. Maynard
Thos. Castberg

Inventor:
Thomas D. Quigley,
By G. H. Strong.
his atty

UNITED STATES PATENT OFFICE.

THOMAS D. QUIGLEY, OF SAN FRANCISCO, CALIFORNIA.

PNEUMATIC VEHICLE-SPRING.

1,029,945.

Specification of Letters Patent. Patented June 18, 1912.

Application filed April 11, 1910. Serial No. 554,783.

*To all whom it may concern:*

Be it known that I, THOMAS D. QUIGLEY, a citizen of the United States, residing in the city and county of San Francisco and State of California, have invented new and useful Improvements in Pneumatic Vehicle-Springs, of which the following is a specification.

My invention relates to improvements in the mounting of vehicles, such as automobiles, upon the bearing-wheels so as to provide elastic cushioning means between the body of the vehicle and the running-gear.

It consists in a combination of pneumatic cushions located contiguous to the wheels of the vehicle and so connected that all the cushions coact with each other.

It also comprises details of construction which will be more fully explained by reference to the accompanying drawings, in which—

Figure 1:
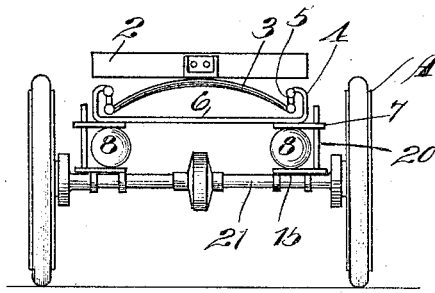
Figure 2:
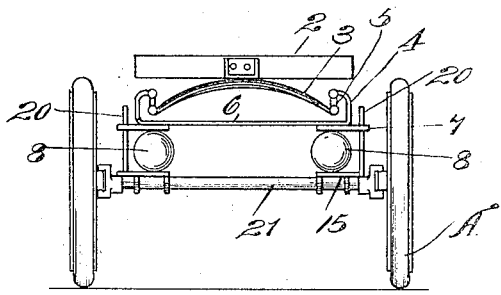
Figure 3:
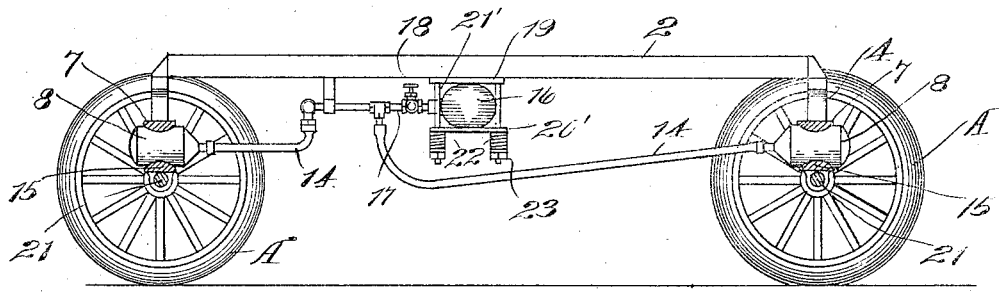
Figure 4:
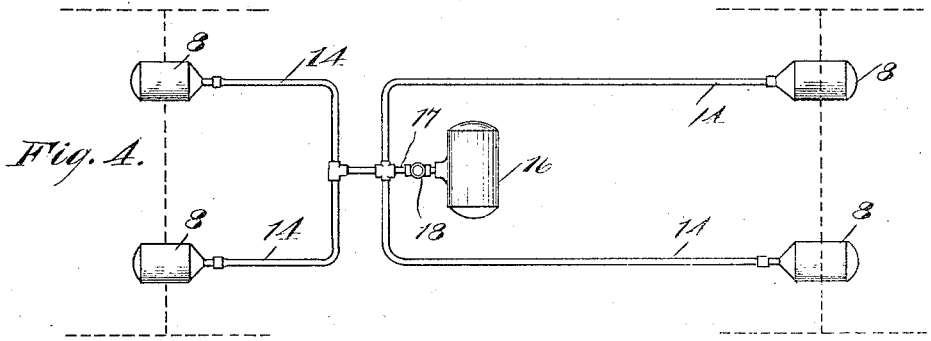
Figure 5:
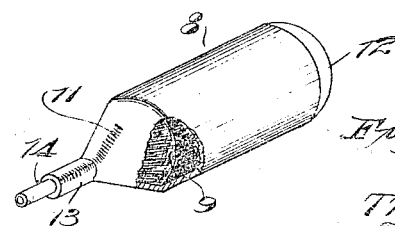

Figure 1 is a rear end view. Fig. 2 a front view. Fig. 3 a side elevation, partly in section. Fig. 4 a plan view of the cushions and connections. Fig. 5 a perspective and partial section of one of the cushions.

Various combinations, including independent air cushions, have been employed for the purpose of relieving the shocks to vehicles due to rapid travel over the ground. In my invention I have so connected a series of cushions that the air is freely movable from one to another so that the cushions coact to produce an improved result.

As shown in the drawings, A are the vehicle wheels, here shown of an automobile. 2 is the frame or chassis of the vehicle, which is here shown as directly mounted upon springs 3, which springs are connected with spring-hangers 4 by links 5. These spring-hangers extend upwardly from the ends of transverse bars 6, which bars rest upon plates 7, and these plates are supported in turn upon pneumatic cushions 8. These cushions are preferably made cylindrical in form, and they consist of an inner flexible and impermeable member 9, and an exterior flexible casing which is substantially inelastic and resistant to extension. I have shown these parts as being cylindrical, and the outer casing may be laced together as at 11, after the inner member has been introduced. The rear ends of these members may be hemispherical, as at 12, and the front end conical, and having a tubular extension 13 from the apex of the cone, to form connection with the conducting pipes 14. I preferably support these cylindrical cushions upon convex bearings 15, which provide a very suitable support between which the cylinders are compressed and expand by the varying pressures brought upon them by the stresses caused by the movement of the vehicle.

The pipes 14 all connect to a common meeting point, and are so coupled that upon the compression of either one of the cushions, the air in the said cushion will be partially expelled, and traversing the connecting pipes 14, will be distributed into the other cushions which may not at that instant be under special compression, and in the same manner all of the cushions will, upon special compression, drive the air temporarily into the pipes, and into either of the other cushions which at the time is under least compression. Thus the springs upon one end of the vehicle, or upon one angle thereof, may be subject to a considerable compression by reason of the wheel at that point dropping into a depression in the road, while the spring at the other end may be temporarily rising, and the air will then pass from the spring which is being compressed, into the ones which are subject to the less compression. 16 is another cushion which is located at some convenient point intermediate of the cushions 8, and is connected with the conduits 14 by the pipe as at 17, and provided with a controlling cock at 18. This intermediate cushion may serve, first as a common source of supply through which the cushions 8 may all be inflated, and any suitable air pressure introduced into the cushions. In the same manner, if the cock 18 remains open, it will be seen that the cushion 16 will act as an equalizer for the air which may be temporarily forced from either of the cushions by road shocks as above stated. It will be seen that by the combination of the elastic cushions 8, and the flexible steel springs 3, a joint co-action will result which produces an exceedingly easy riding vehicle.

In order to insure the proper vertical movement of the body and prevent transverse movements I have shown sufficiently rigid standards 20 fixed to plates which are clipped to the wheel axles 21, and these standards extend through openings in the plates 7, so that these plates may slide vertically upon the standards, and the yielding motion will be substantially confined to a vertical one.

The cushion 16 lies between a horizontal plate 19 supported from the vehicle body, and a plate 20' slidable upon vertical rods 21', and normally pressed upward by spiral springs 22, the lower ends of which are supported by nuts 23 upon the rods 21'.

The action will then be as follows: The cushions are inflated by means of any suitable air-forcing apparatus connected with some connecting tube until, when loaded, they assume the form of a flattened oval, the relief cushion 16 being maintained in this form by the springs 22. Whenever, by the irregularities of the road surface any one or more of the cushions 8 are temporarily compressed, the air will be forced out through the connecting pipes 14 to the uncompressed cushions and to the intermediate one 16, and the air entering this cushion tends to expand it against the tension of the springs 22, which will thus be temporarily compressed, and will immediately expand again when pressure within the cushion is relieved. This combination produces a very sensitive spring system.

Having thus described my invention, what I claim and desire to secure by Letters Patent is—

A pneumatic cushion spring for vehicles, including flexible air-containing cylinders supported upon the front and rear axles, valve controlled connections between said cylinders, an intermediate flexible air-containing cushion cylinder with which the pipes are also connected, plates between which said cushion is supported, guide rods upon which one plate is movable, and springs acting upon said plate to normally compress the cushion.

In testimony whereof I have hereunto set my hand in the presence of two subscribing witnesses.

THOMAS D. QUIGLEY.

Witnesses:
RAYMOND A. LEONARD,
JOHN T. QUIGLEY.